(12) United States Patent
Eberlein et al.

(10) Patent No.: US 6,993,094 B1
(45) Date of Patent: Jan. 31, 2006

(54) COARSE FREQUENCY SYNCHRONIZATION IN MULTICARRIER SYSTEMS

(75) Inventors: Ernst Eberlein, Grossenseebach (DE); Sabah Badri, Erlangen (DE); Stefan Lipp, Erlangen (DE); Stephan Buchholz, Munich (DE); Albert Heuberger, Erlangen (DE); Heinz Gerhaeuser, Waischenfeld (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/673,265

(22) PCT Filed: Apr. 14, 1998

(86) PCT No.: PCT/EP98/02170

§ 371 (c)(1),
(2), (4) Date: Nov. 29, 2000

(87) PCT Pub. No.: WO99/53666

PCT Pub. Date: Oct. 21, 1999

(51) Int. Cl.
*H04L 27/22* (2006.01)
*H04L 27/06* (2006.01)

(52) U.S. Cl. ...................... 375/326; 375/344
(58) Field of Classification Search ............ 375/326, 375/268, 320, 339, 342, 343, 344, 345, 362, 375/365, 367, 368, 260; 370/208; 455/209, 455/192.2
See application file for complete search history.

(56) References Cited

U.S. PATENT DOCUMENTS

| 5,444,697 A | * | 8/1995 | Leung et al. | 370/207 |
|---|---|---|---|---|
| 5,594,757 A | * | 1/1997 | Rohani | 375/344 |
| 5,602,835 A | * | 2/1997 | Seki et al. | 375/362 |
| 5,717,722 A | * | 2/1998 | Mori | 375/326 |
| 5,745,535 A | * | 4/1998 | Mori | 375/355 |
| 5,936,462 A | * | 8/1999 | Muraishi | 329/311 |
| 5,991,289 A | * | 11/1999 | Huang et al. | 370/350 |
| 6,058,101 A | * | 5/2000 | Huang et al. | 370/208 |
| 6,359,938 B1 | * | 3/2002 | Keevill et al. | 375/316 |

FOREIGN PATENT DOCUMENTS

| JP | 8251135 | 9/1996 |
|---|---|---|
| WO | 9800946 | 1/1998 |

OTHER PUBLICATIONS

Moose, "A Technique for Orthogonal Frequency Division Multiplexing Frequency Offset Correction", *IEEE Transactions on Communications*, vol. 42, No. 10, pp. 2908-2914 (Oct. 1994).

(Continued)

*Primary Examiner*—Betsy L. Deppe
(74) *Attorney, Agent, or Firm*—Roylance, Abrams, Berdo & Goodman, L.L.P

(57) ABSTRACT

A method and apparatus provide coarse frequency synchronization compensating for a carrier frequency deviation from an oscillator frequency in a demodulation system capable of demodulating a signal having a frame structure with at least one useful symbol and a reference symbol which is an amplitude-modulated sequence. A received and down-converted signal undergoes amplitude-demodulation to generate an envelope that is correlated with a predetermined reference pattern to determine the carrier frequency deviation. Finally, the oscillator frequency is controlled based on the carrier frequency deviation. The reference symbol may comprise two identical sequences. In this case, the envelope obtained by the amplitude-demodulation has two portions which are based on the identical sequences. One of the portions of the envelope is correlated with the other one of the portions in order to determine the carrier frequency deviation. The oscillator frequency is controlled based on the determined carrier frequency deviation.

14 Claims, 7 Drawing Sheets

OTHER PUBLICATIONS

Keller and Hanzo, "Orthogonal Frequency Division Multiplex Synchronisation Techniques for Wireless Local Area Networks", *IEEEInternational Symposium on Personal, Indoor and Mobile Radio Communications*, pp. 963-967 (Oct. 1996).

Classen and Meyr, "Synchronization Algorithms for an OFDM System for Mobile Communication", Condierung für Quelle, Kanal and Übertragung: ITG-Fachbericht, pp. 105-114 (Oct. 1994).

Schmidl and Cox, "Low-Overhead, Low-Complexity [Burst] Synthronization for OFDM", *Proc. IEEEInt. Conf. on Commun.*, pp. 1301-1306 (1996).

Zou and Wu, "COFDM: An Overview", *IEEE Transactions on Broadcasting*, vol. 41, No. 1, pp. 1-8 (Mar. 1995).

Palacherla, "DSP-$\mu$P Routine Computes Magnitude", *EDN Electrical Design News*, vol. 34, No. 22, pp. 225-226 (Oct. 1989).

Adams and Brady, "Magnitude Approximations for Microprocessor Implementation", *IEEEMicro*, vol. 3, No. 5, pp. 27-31 (Oct. 1983).

Luise and Reggiannini, "Carrier Frequency Acquisition and Tracking for OFDM Systems", *IEEE Transactionson Communications*, vol. 44, No. 11, pp. 1590-1598 (Nov. 1996).

Tuisel and Kammeyer, "Carrier-Recovery for Multicarrier-Transmission Over Mobile Radio Channels", *Int. Conf. on Acoustics, Speech and Signal Processing (ICASSP 92)*, San Francisco, Band 4, pp. 677-680 (1992).

Onizawa, Mizoguchi, Kumagai, Takanashi, and Morikura, "Synchronization Scheme of OFDM Systems for High Speed Wireless LAN", *Technical Report of the Institute of Electronics, Information and Communication Engineers*, vol. 97, No. 489, pp. 137-142 (Jan. 1998).

* cited by examiner

COARSE FREQUENCY SYNCHRONIZATION IN MULTICARRIER SYSTEMS

FIELD OF THE INVENTION

The present invention relates to methods and apparatus for performing a coarse frequency synchronization compensating for a carrier frequency deviation from an oscillator frequency in a demodulation system. In particular, the present invention relates to such methods and apparatus in a demodulation system for multi-carrier modulation signals, wherein the multi-carrier modulation (MCM) signals have a frame structure comprising at least one useful symbol and a reference symbol.

The present invention is particularly useful in a MCM transmission system using an orthogonal frequency division multiplexing (OFDM) for digital broadcasting.

BACKGROUND OF THE INVENTION

In a multi carrier transmission system (MCM, OFDM), the effect of a carrier frequency offset is substantially more considerable than in a single carrier transmission system. MCM is more sensitive to phase noise and frequency offset which occurs as amplitude distortion and inter carrier interference (ICI). The inter carrier interference has the effect that the subcarriers are no longer orthogonal in relation to each other. Frequency offsets occur after power on or also later due to frequency deviation of the oscillators used for downconversion into baseband. Typical accuracies for the frequency of a free running oscillator are about ±50 ppm of the carrier frequency. With a carrier frequency in the S-band of 2.34 GHz, for example, there will be a maximum local oscillator (LO) frequency deviation of above 100 kHz (117.25 kHz). The above named effects result in high requirements on the algorithm used for frequency offset correction.

DESCRIPTION OF PRIOR ART

Most prior art algorithms for frequency synchronization divide frequency correction into two stages. In the first stage, a coarse synchronization is performed. In the second stage, a fine correction can be achieved. A frequently used algorithm for coarse synchronization of the carrier frequency uses a synchronization symbol which has a special spectral pattern in the frequency domain. Such a synchronization symbol is, for example, a CAZAC sequence (CAZAC=Constant Amplitude Zero Autocorrelation). Through comparison, i.e. the correlation, of the power spectrum of the received signal with that of the transmitted signal, the frequency carrier offset can be coarsely estimated. These prior art algorithms all work in the frequency domain. Reference is made, for example, to Ferdinand Claben, Heinrich Meyr, "Synchronization Algorithms for an OFDM System for Mobile Communication", ITG-Fachtagung 130, Codierung für Quelle, Kanal und Übertragung, pp. 105–113, Oct. 26–28, 1994; and Timothy M. Schmidl, Donald C. Cox, "Low-Overhead, Low-Complexity [Burst] Synchronization for OFDM", in Proceedings of the IEEE International Conference on Communication ICC 1996, pp. 1301–1306 (1996).

For the coarse synchronization of the carrier frequency, Paul H. Moose, "A Technique for Orthogonal Frequency Division Multiplexing Frequency Offset Correction", IEEE Transaction On Communications, Vol. 42, No. 10, October 1994, suggest increasing the spacing between the subcarriers such that the subcarrier distance is greater than the maximum frequency difference between the received and transmitted carriers. The subcarrier distance is increased by reducing the number of sample values which are transformed by the Fast Fourier Transform. This corresponds to a reduction of the number of sampling values which are transformed by the Fast Fourier Transform.

WO 9800946 A relates to a system for a timing and frequency synchronization of OFDM signals. OFDM training symbols are used to obtain full synchronization in less than two data frames. The OFDM training symbols are placed into the OFDM signal, preferably at least once every frame. The first OFDM training symbol is produced by modulating the even-numbered OFDM sub-carriers whereas the odd-numbered OFDM sub-carriers are suppressed. Thus, the first OFDM training symbol is produced by modulating the even-numbered carriers of this symbol with a first predetermined pseudo noise sequence. This results in a time-domain OFDM symbol that has two identical halves since each of the even-numbered sub-carrier frequencies repeats every half symbol interval. In case a carrier frequency offset is not greater than a sub-carrier bandwidth, the carrier frequency offset can be determined using the phase difference between the two halves of the first OFDM training symbol. In case the carrier frequency offset can be greater than a sub-carrier bandwidth a second OFDM training symbol is used which is formed by using a second predetermined pseudo noise sequence to modulate the even-numbered frequencies of this symbol and by using a third predetermined pseudo noise sequence to modulate the odd-numbered carriers of this symbol. This second OFDM training symbol is used in order to determine an integer part of the carrier frequency offset. This integer part and a positive or negative fractional part determined from the first OFDM training symbol are used for performing the coarse frequency synchronization. In order to determine the integer part of the carrier frequency offset, fast Fourier transforms of the two training symbols are required.

SUMMARY OF THE INVENTION

It is an object of the present invention to provide methods and apparatus for performing a coarse frequency synchronization even in the case of frequency offsets that correspond to a multiple of the subcarrier distance in a MCM signal. In accordance with a first aspect, the present invention provides a method of performing a coarse frequency synchronization compensating for a carrier frequency deviation from an oscillator frequency in a demodulation system capable of demodulating a signal having a frame structure, said frame structure comprising at least one useful symbol and a reference symbol, said reference symbol being an amplitude-modulated bit sequence, the method comprising the steps of:

receiving the signal;

down-converting the received signal;

performing an amplitude-demodulation of the down-converted signal in order to generate an envelope; correlating the envelope with a predetermined reference pattern in order to determine the carrier frequency deviation; and controlling the oscillator frequency based on the carrier frequency deviation.

In accordance with a second aspect, the present invention provides a method of performing a coarse frequency synchronization compensating for a carrier frequency deviation from an oscillator frequency in a demodulation system capable of demodulating a signal having a frame structure, the frame structure comprising at least one useful symbol and a reference symbol, the reference symbol being an amplitude-modulated bit sequence which comprises two identical sequences, the method comprising the steps of:

receiving the signal;

down-converting the received signal;

performing an amplitude-demodulation of the down-converted signal in order to generate an envelope, the envelope having two portions which are based on the identical sequences;

correlating one of the portions of the envelope with another one of the portions in order to determine the carrier frequency deviation; and controlling the oscillator frequency based on the carrier frequency deviation.

In accordance with a third aspect, the present invention provides an apparatus for performing a coarse frequency synchronization compensating for a carrier frequency deviation from an oscillator frequency, for a demodulation system capable of demodulating a signal having a frame structure, the frame structure comprising at least one useful symbol and a reference symbol, the reference symbol being an amplitude-modulated bit sequence, the apparatus comprising:

receiving means for receiving the signal;

a down-converter for down-converting the received signal;

an amplitude-demodulator for performing an amplitude-demodulation of the down-converted signal in order to generate an envelope;

a correlator for correlating the envelope with a predetermined reference pattern in order to determine the carrier frequency deviation; and means for controlling the oscillator frequency based on the carrier frequency deviation.

In accordance with a fourth aspect, the present invention provides an apparatus for performing a coarse frequency synchronization compensating for a carrier frequency deviation from an oscillator frequency, for a demodulation system capable of demodulating a signal having a frame structure, the frame structure comprising at least one useful symbol and a reference symbol, the reference symbol being an amplitude-modulated bit sequence which comprises two identical sequences, the apparatus comprising:

receiving means for receiving the signal;

a down-converter for down-converting the received signal;

an amplitude-demodulator for performing an amplitude-demodulation of the down-converted signal in order to generate an envelope, the envelope having two portions which are based on the identical sequences;

a correlator for correlating one of the portions of the envelope with another one of the portions in order to determine the carrier frequency deviation; and means for controlling the oscillator frequency based on the carrier frequency deviation.

The present invention provides a new scheme for a coarse frequency synchronization, in particular in MCM systems. The present invention is particularly useful in systems which use a differential coding and mapping along the frequency axis. In accordance with the present invention, the algorithm for the coarse frequency synchronization is based on a reference symbol which is formed by an amplitude-modulated sequence. The length of this amplitude-modulated sequence symbol may be less than that of the useful symbol. The algorithm in accordance with the present invention can be used in the time domain or the frequency domain. In order to determine a frequency offset, a correlation of the received MCM symbol with a predetermined reference pattern is performed in accordance with a first embodiment of the present invention. In accordance with a second embodiment of the present invention, the reference symbol comprises at least two identical amplitude-modulated sequences, wherein a frequency offset is determined based on a correlation between demodulated portions corresponding to these identical sequences. It is preferred to select the mean amplitude of the reference symbol identically to the mean amplitude of the rest of the signal, i.e. to select all of the samples of the demodulated amplitude-modulated sequence in the middle of their amplitude range. Care has to be taken that the time constant of an automatic gain control (AGC) is selected to be long enough that the strong signal part of the reference symbol does not excessively influence the automatic gain control signal. Otherwise, the signal occurring after the amplitude-modulated sequence would be strongly attenuated.

According to preferred embodiments of the present invention, the amplitude-modulated sequence of the reference symbol is chosen to be a pseudo random bit sequence (PRBS) since such a sequence has good autocorrelation properties with a distinct correlation maximum in a correlation signal which should be as wide as possible.

In accordance with preferred embodiments of the present invention, the coarse frequency synchronization can be performed using the amplitude-modulated sequence after a frame synchronization of a MCM signal has been accomplished. The inventive algorithm works both in the time and the frequency domains. Frequency offsets as high as ±10 times the subcarrier spacing can be corrected.

BRIEF DESCRIPTION OF THE DRAWINGS

In the following, preferred embodiments of the present invention will be explained in detail on the basis of the drawings enclosed, in which.

DETAILED DESCRIPTION OF THE PREFERRED EMBODIMENTS

Figure 1:
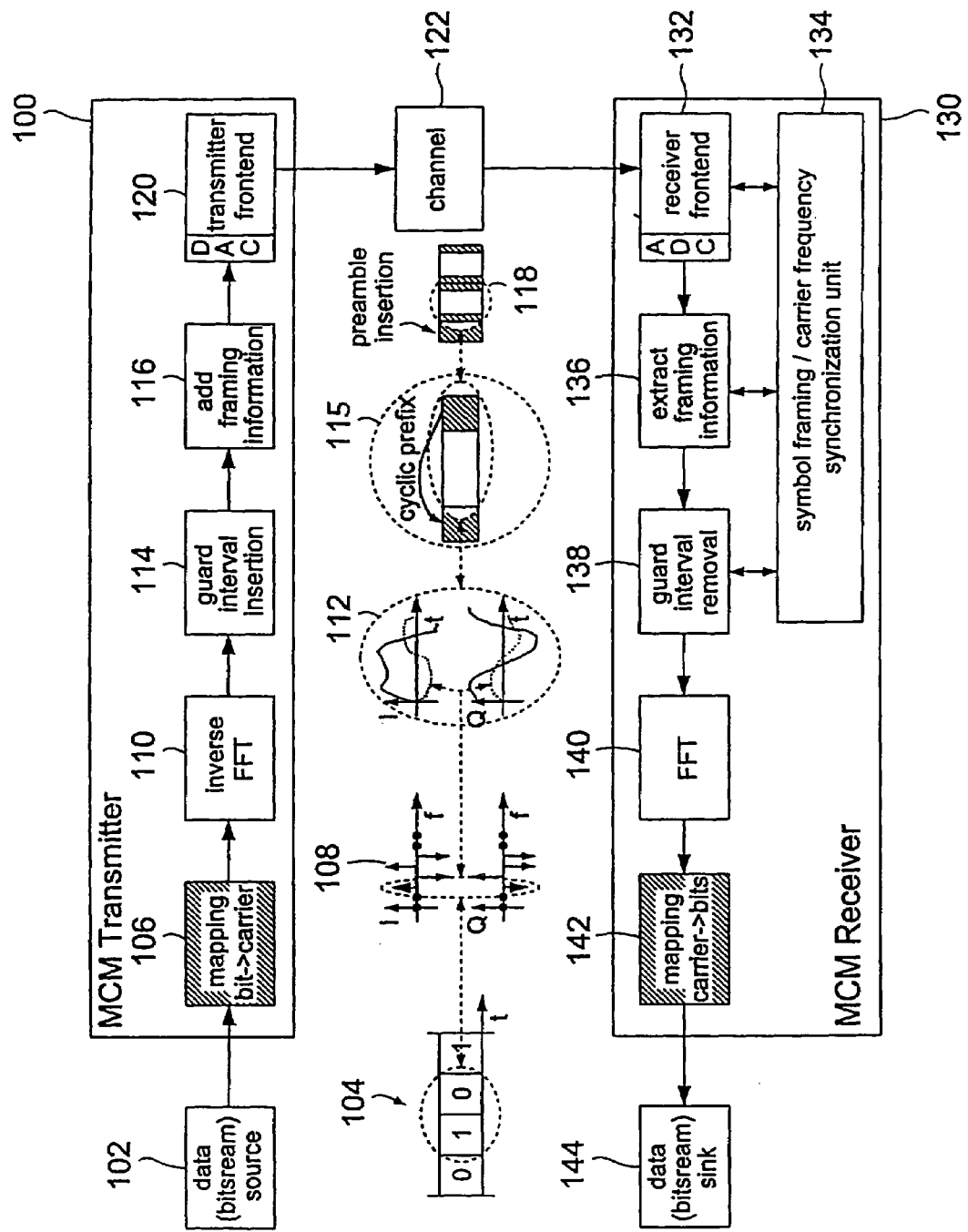
FIG. 1 shows a schematic overview of a MCM transmission system comprising a coarse frequency synchronization unit in accordance with the present invention.

Before discussing the present invention in detail, the mode of operation of a MCM transmission system is described referring to FIG. 1. Although the present invention is explained referring to a MCM system as shown in FIG. 1, it is clear that the present invention can be used in connection with different signal transmissions as long as the transmitted signal comprises useful symbols and reference symbols.

Referring to FIG. 1, at 100 a MCM transmitter is shown that substantially corresponds to a prior art MCM transmitter. A description of such a MCM transmitter can be found, for example, in William Y. Zou, Yiyan Wu, "COFDM: AN OVERVIEW", IEEE Transactions on Broadcasting, vol. 41, No. 1, March 1995.

A data source 102 provides a serial bitstream 104 to the MCM transmitter. The incoming serial bitstream 104 is applied to a bit-carrier mapper 106 which produces a sequence of spectra 108 from the incoming serial bitstream 104. An inverse fast Fourier transform (IFFT) 110 is performed on the sequence of spectra 108 in order to produce a MCM time domain signal 112. The MCM time domain signal forms the useful MCM symbol of the MCM time signal. To avoid intersymbol interference (ISI) caused by multipath distortion, a unit 114 is provided for inserting a guard interval of fixed length between adjacent MCM symbols in time. In accordance with a preferred embodiment of the present invention, the last part of the useful MCM symbol is used as the guard interval by placing same in front of the useful symbol. The resulting MCM symbol is shown at 115 in FIG. 1 and corresponds to a MCM symbol 160 depicted in FIG. 4.

Figure 4:
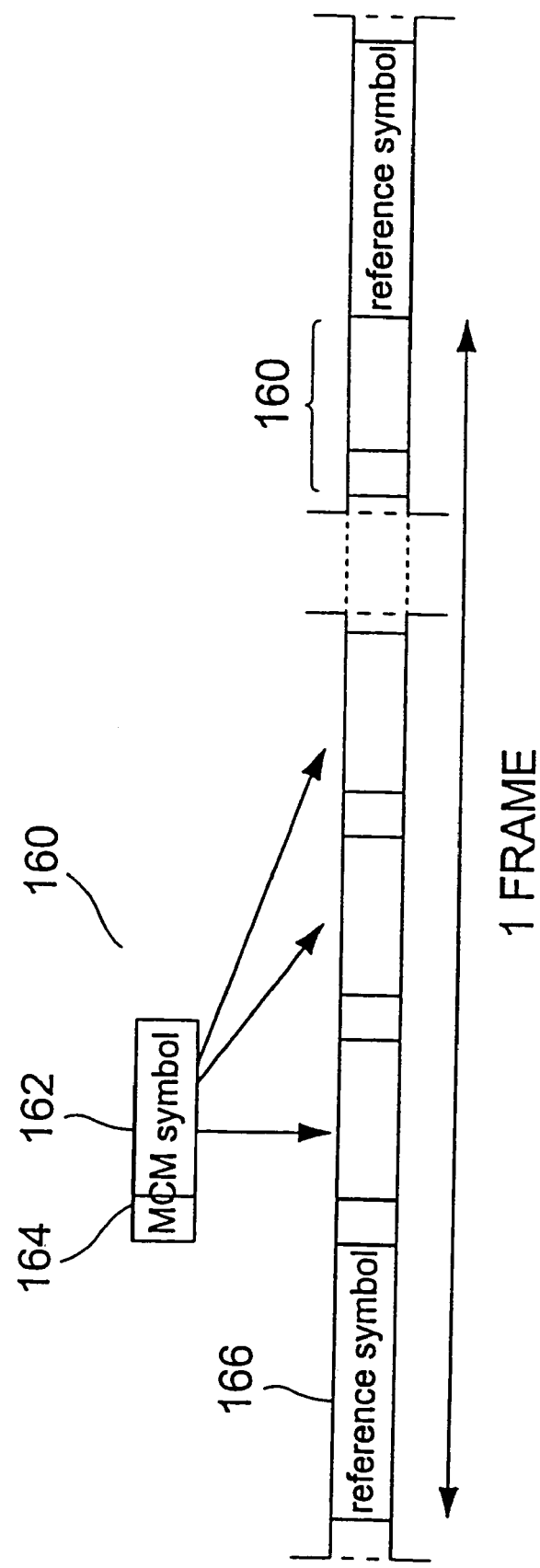
FIG. 4 shows a schematic view of a typical MCM signal having a frame structure.

FIG. 4 shows the construction of a typical MCM signal having a frame structure. One frame of the MCM time signal is composed of a plurality of MCM symbols 160. Each MCM symbol 160 is formed by an useful MCM symbol 162 and a guard interval 164 associated therewith. As shown in FIG. 4, each frame comprises one reference symbol 166. The present invention can advantageously be used with such a MCM signal, however, such a signal structure being not necessary for performing the present invention as long as the transmitted signal comprises a useful portion and at least one reference symbol.

In order to obtain the final frame structure shown in FIG. 4, a unit 116 for adding a reference symbol for each predetermined number of MCM symbols is provided.

In accordance with the present invention, the reference symbol is an amplitude modulated bit sequence. Thus, an amplitude modulation of a bit sequence is performed such that the envelope of the amplitude modulated bit sequence defines a reference pattern of the reference symbol. This reference pattern defined by the envelope of the amplitude modulated bit sequence has to be detected when receiving the MCM signal at a MCM receiver. In a preferred embodiment of the present invention, a pseudo random bit sequence having good autocorrelation properties is used as the bit sequence for the amplitude modulation.

The choice of length and repetition rate of the reference symbol depends on the properties of the channel through which the MCM signal is transmitted, e.g. the coherence time of the channel. In addition, the repetition rate and the length of the reference symbol, in other words the number of useful symbols in each frame, depends on the receiver requirements concerning mean time for initial synchronization and mean time for resynchronization after synchronization loss due to a channel fade.

The resulting MCM signal having the structure shown at 118 in FIG. 1 is applied to the transmitter front end 120. Roughly speaking, at the transmitter front end 120, a digital/analog conversion and an up-converting of the MCM signal is performed. Thereafter, the MCM signal is transmitted through a channel 122.

Following, the mode of operation of a MCM receiver 130 is shortly described referring to FIG. 1. The MCM signal is received at the receiver front end 132. In the receiver front end 132, the MCM signal is down-converted and, furthermore, a analog/digital conversion of the down-converted signal is performed.

The down-converted MCM signal is provided to a symbol frame/carrier frequency synchronization unit 134.

A first object of the symbol frame/carrier frequency synchronization unit is to perform a frame synchronization on the basis of the amplitude-modulated reference symbol. This frame synchronization is performed on the basis of a correlation between the amplitude-demodulated reference symbol and a predetermined reference pattern stored in the MCM receiver.

A second object of the symbol frame/carrier frequency synchronization unit is to perform a coarse frequency synchronization of the MCM signal. To this end, the symbol frame/carrier frequency synchronization unit 134 serves as a coarse frequency synchronization unit for determining a coarse frequency offset of the carrier frequency caused, for example, by a difference of the frequencies between the local oscillator of the transmitter and the local oscillator of the receiver. The determined frequency is used in order to perform a coarse frequency correction. The mode of operation of the coarse frequency synchronization unit is described in detail referring to FIGS. 2 and 3 hereinafter.

As described above, the frame synchronization unit 134 determines the location of the reference symbol in the MCM signal. Based on the determination of the frame synchronization unit 134, a reference symbol extracting unit 136 extracts the framing information, i.e. the reference symbol, from the MCM signal coming from the receiver front end 132. After the extraction of the reference symbol, the MCM signal is applied to a guard interval removal unit 138. The result of the signal processing performed hereherto in the MCM receiver are the useful MCM symbols.

The useful MCM symbols output from the guard interval removal unit 138 are provided to a fast Fourier transform unit 140 in order to provide a sequence of spectra from the useful symbols. Thereafter, the sequence of spectra is provided to a carrier-bit mapper 142 in which the serial bitstream is recovered. This serial bitstream is provided to a data sink 144.

Figure 2:
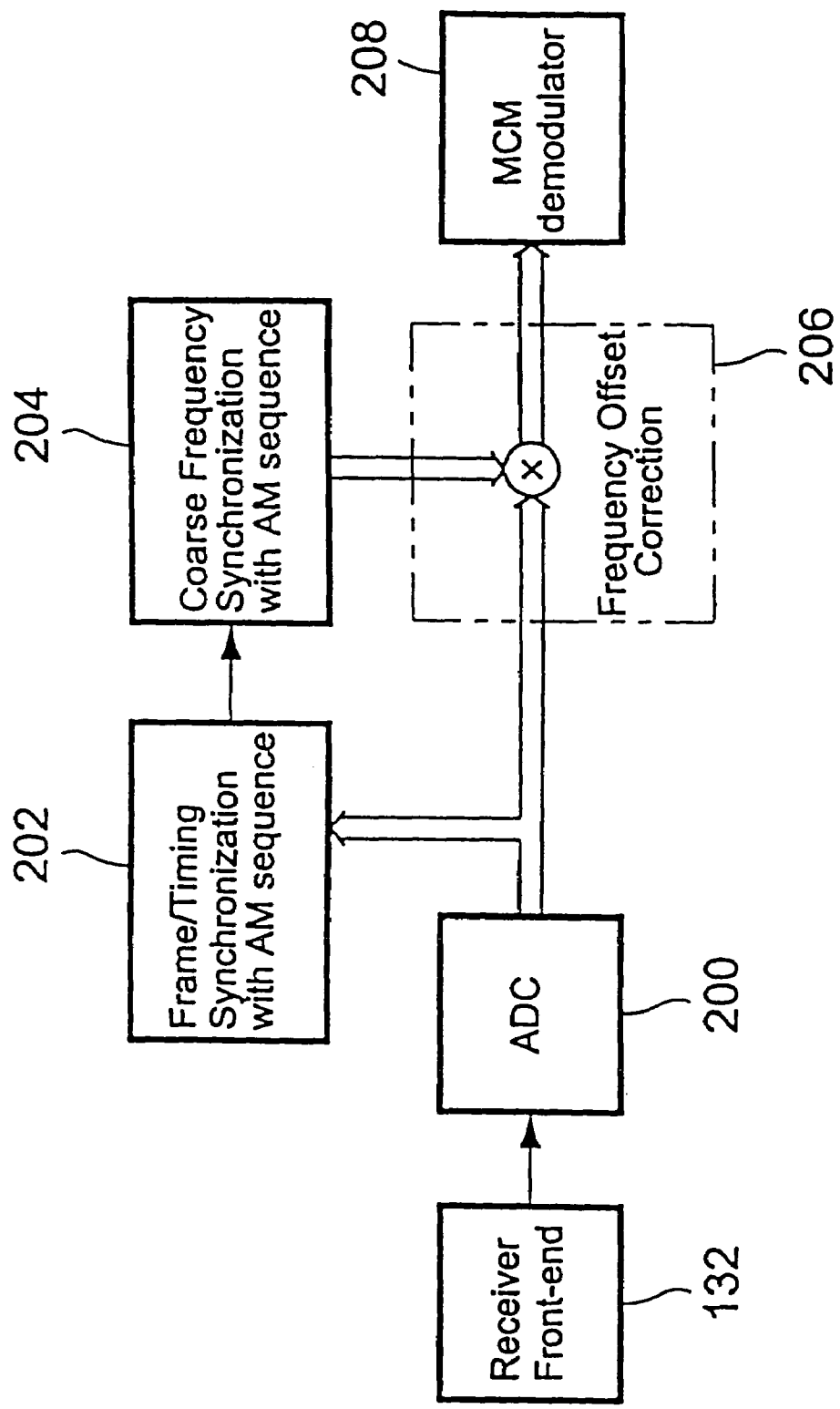
FIG. 2 shows a schematic block diagram for illustrating the coarse frequency synchronization in accordance with the present invention.

Following, the mode of operation of the coarse frequency synchronization unit will be described in detail referring to FIGS. 2 and 3. As it is shown in FIG. 2, the output of the receiver front end 132 is connected to an analog/digital converter 200. The down-converted MCM signal is sampled at the output of the analog/digital converter 200 and is applied to a frame/timing synchronization unit 202. In a preferred embodiment, a fast running automatic gain control (AGC) (not shown) is provided preceding the frame/timing synchronization unit in order to eliminate fast channel fluctuations. The fast AGC is used in addition to the normally slow AGC in the signal path, in the case of transmission over a multipath channel with long channel impulse response and frequency selective fading. The fast AGC adjusts the average amplitude range of the signal to the known average amplitude of the reference symbol.

As described above, the frame/timing synchronization unit uses the amplitude-modulated sequence in the received signal in order to extract the framing information from the MCM signal and further to remove the guard intervals therefrom. After the frame/timing synchronization unit 202 it follows a coarse frequency synchronization unit 204 which estimates a coarse frequency offset based on the amplitude-modulated sequence of the reference symbol of the MCM signal. In the coarse frequency synchronization unit 204, a frequency offset of the carrier frequency with respect to the oscillator frequency in the MCM receiver is determined in order to perform a frequency offset correction in a block 206. This frequency offset correction in block 206 is performed by a complex multiplication. The output of the frequency offset correction block 206 is applied to the MCM demodulator 208 formed by the Fast Fourier Transform unit 140 and the carrier-bit mapper 142 shown in FIG. 1.

In order to perform the inventive coarse frequency synchronization, in either case, an amplitude-demodulation has to be performed on a preprocessed MCM signal. The preprocessing may be, for example, the down-conversion and the analog/digital conversion of the MCM signal. The result of the amplitude-demodulation of the preprocessed MCM signal is an envelope representing the amplitude of the MCM signal.

For the amplitude demodulation, a simple $\text{alpha}_{max+}\text{beta}_{min-}$ method can be used. This method is described for example in Palacherla A.: DSP-μP Routine Computes Magnitude, EDN, Oct. 26, 1989; and Adams, W. T., and Bradley, J.: Magnitude Approximations for Microprocessor Implementation, IEEE Micro, Vol. 3, No. 5, October 1983.

It is clear that amplitude determining methods different from the described $\text{alpha}_{max+}$ $\text{beta}_{min-}$ method can be used. For simplification, it is possible to reduce the amplitude calculation to a detection as to whether the current amplitude is above or below the average amplitude. The output signal then consists of a −1/+1 sequence which can be used to determine a coarse frequency offset by performing a correlation. This correlation can easily be performed using a simple integrated circuit (IC).

In addition, an oversampling of the signal received at the RF front end can be performed. For example, the received signal can be expressed with two times oversampling.

In accordance with a first embodiment of the present invention, a carrier frequency offset of the MCM signal from an oscillator frequency in the MCM receiver is determined by correlating the envelope obtained by performing the amplitude-demodulation as described above with a predetermined reference pattern.

In case there is no frequency offset, the received reference symbol r(k) will be:

$$r(k) = S_{AM}(k) + n(k) \qquad \text{(Eq. 1)}$$

wherein n(k) designates "additive Gaussian noise" and SAM denotes the AM sequence which has been sent. In order to simplify the calculation the additive Gaussian noise can be neglected. It follows:

$$r(k) \cong S_{AM}(k) \qquad \text{(Eq. 2)}$$

In case a constant frequency offset ?f is present, the received signal will be:

$$\tilde{r}(k) = S_{AM}(k) \cdot e^{j2\pi \Delta f k T_{MCM}} \qquad \text{(Eq. 3)}$$

Information regarding the frequency offset is derived from the correlation of the received signal r(k) with the AM sequence $S_{AM}$ which is known in the receiver:

$$\sum_{k=1}^{\frac{L}{2}} \tilde{r}(k) \cdot S_{AM}^*(k) = \sum_{k=1}^{\frac{L}{2}} |S_{AM}(k)|^2 e^{j2\pi \Delta f k T_{MCM}} \qquad \text{(Eq. 4)}$$

Thus, the frequency offset is:

$$\Delta f = \frac{1}{2\pi T_{MCM}} \arg\left(\sum_{k=1}^{\frac{L}{2}} r(k) \cdot S_{AM}^*(k)\right) - \frac{1}{2\pi T_{MCM}} \arg\left(\sum_{k=1}^{\frac{L}{2}} |S_{AM}(k)|^2\right) \qquad \text{(Eq. 5)}$$

Since the argument of . $S_{AM}(k)|^2$ is zero the frequency offset is:

$$\Delta f = \frac{1}{2\pi T_{MCM}} \arg\left(\sum_{k=1}^{\frac{L}{2}} \tilde{r}(k) \cdot S_{AM}^*(k)\right) \qquad \text{(Eq. 6)}$$

Figure 3:
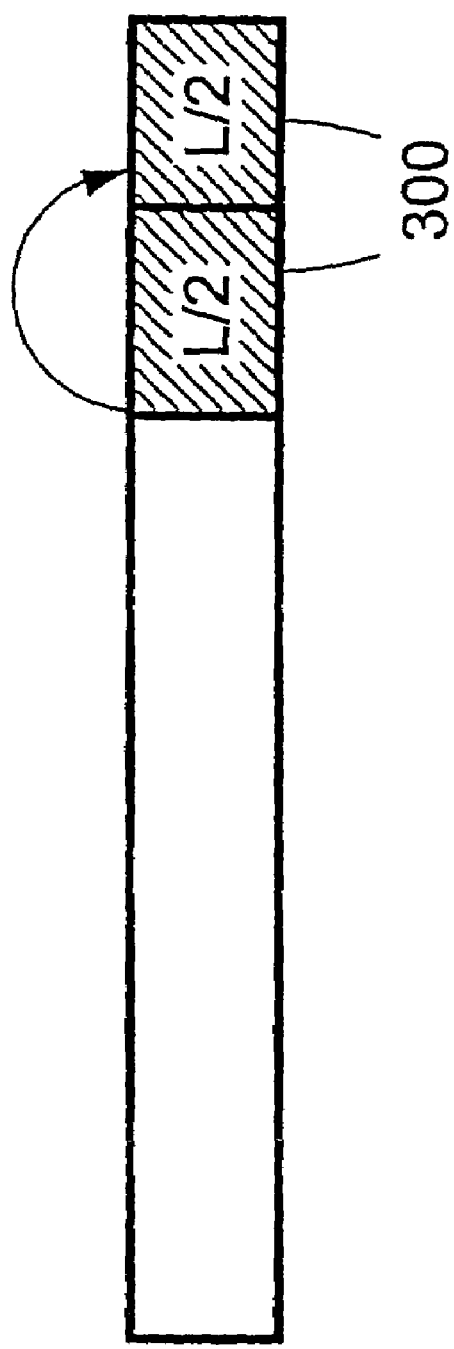
FIG. 3 shows a schematic view of a reference symbol comprising two identical sequences.

In accordance with a second embodiment of the coarse frequency synchronization algorithm in accordance with the present invention, a reference symbol comprising at least two identical sequences 300 as shown in FIG. 3 is used. FIG. 3 shows the reference symbol of a MCM signal having two identical sequences 300 of a length of L/2 each. L designates the number of values of the two sequences 300 of the reference symbol.

As shown in FIG. 3, within the amplitude-modulated sequence, there are at least two identical sections devoted to the coarse frequency synchronization. Two such sections, each containing L/2 samples, are shown at the end of the amplitude-modulated sequence in FIG. 3. The amplitude-modulated sequence contains a large number of samples. For a non-ambiguous observation of the phase, only enough samples to contain a phase rotation of 2p should be used. This number is defined as L/2 in FIG. 3.

Following, a mathematical derivation of the determination of a carrier frequency deviation is presented. In accordance with FIG. 3, the following equation applies for the two identical sequences 300:

$$s\left(0 < k \leq \frac{L}{2}\right) \equiv s\left(\frac{L}{2} < k \leq L\right) \qquad \text{(Eq. 7)}$$

If no frequency offset is present, the following equation 8 will be met by the received signal:

$$r\left(k + \frac{L}{2}\right) \equiv r(k) \; 0 < k \leq \frac{L}{2} \qquad \text{(Eq. 8)}$$

r(k) designates the values of the identical sequences. k is an index from one to L/2 for the respective samples.

If there is a frequency offset of, for example, ?f, the received signal is:

$$\tilde{r}(k) = r(k) \cdot e^{j2\pi \Delta f k T_{MCM}} \qquad \text{(Eq. 9)}$$

$$\tilde{r}\left(k + \frac{L}{2}\right) = r(k) \cdot e^{j2\pi \Delta f \left(k+\frac{L}{2}\right) T_{MCM}} \qquad \text{(Eq. 10)}$$

$\tilde{r}$ (k) designates sample values of the received portion which are based on the identical sequences. Information regarding the frequency offset is derived from the correlation of the received signal $\tilde{r}$ (k+L/2) with the received signal $\tilde{r}$ (k). This correlation is given by the following equation:

$$\sum_{k=1}^{\frac{L}{2}} \tilde{r}^*\left(k + \frac{L}{2}\right)\tilde{r}(k) = \sum_{k=1}^{\frac{L}{2}} |r(k)|^2 e^{-j2\pi\Delta f \frac{L}{2}T_{MCM}} \quad \text{(Eq. 11)}$$

$\tilde{r}^*$ designates the complex conjugate of the sample values of the portion mentioned above.

Thus, the frequency offset is $$\Delta f = \frac{1}{2\pi\frac{L}{2}T_{MCM}}\arg\left(\sum_{k=1}^{\frac{L}{2}} \tilde{r}\left(k + \frac{L}{2}\right)\cdot \tilde{r}^*(k)\right) - \quad \text{(Eq. 12)}$$

$$\frac{1}{2\pi\frac{L}{2}T_{MCM}}\arg\left(\sum_{k=1}^{\frac{L}{2}} |\tilde{r}(k)|^2\right)$$

Since the argument of $|r(k)|^2$ equals zero, the frequency off-set becomes $$\Delta f = \frac{1}{2\pi\frac{L}{2}T_{MCM}}\arg\left(\sum_{k=1}^{\frac{L}{2}} \tilde{r}\left(k + \frac{L}{2}\right)\cdot \tilde{r}^*(k)\right) \quad \text{(Eq. 13)}$$

Thus, it is clear that in both embodiments, described above, the frequency position of the maximum of the resulting out-put of the correlation determines the estimated value of the offset carrier. Furthermore, as it is also shown in FIG. 2, the correction is performed in a feed forward structure.

An apparatus for performing the coarse frequency synchronization using a reference symbol having two identical sections of the length of L/2 each which has been described above is shown in FIG. 5.

Figure 5:
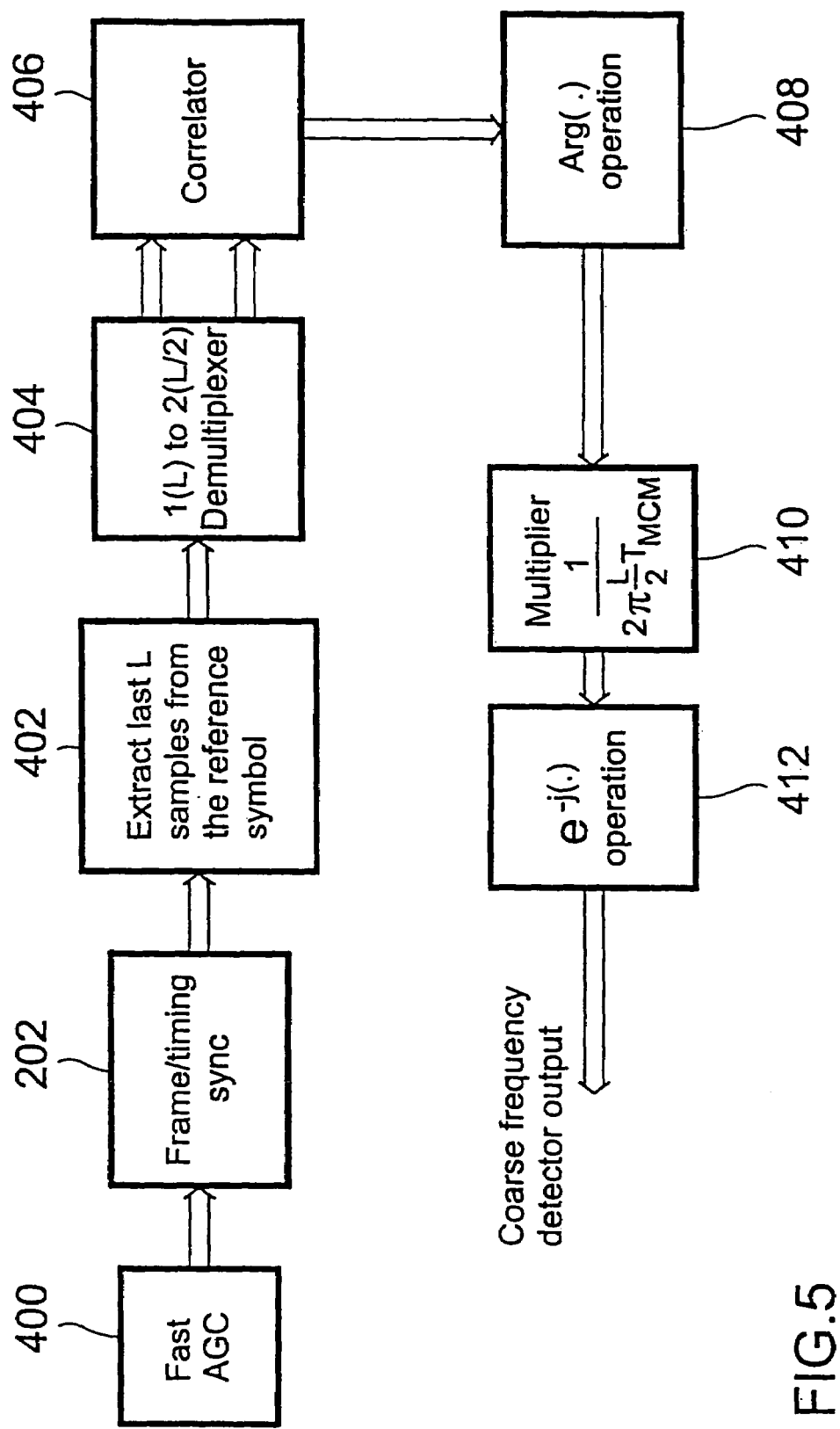
FIG. 5 shows a block diagram of an embodiment of a coarse frequency synchronization unit.

Also shown in FIG. 5 is the frame/timing synchronization unit 202. As can be seen from FIG. 5, a unit 400 for per-forming a fast automatic gain control (time constant<MCM symbol duration) can be provided preceding the frame/timing synchronization unit. The output of the frame/timing synchronization unit 202 is connected to an extracting unit 402 which is operable to extract the last L samples from the reference symbol. The output of the extracting unit 402 is connected to a demultiplexer 404 which recovers the two identical sections having the length of L/2 each from the L samples. The identical sections are applied to a correlator 406 which performs the correlation as described above.

The output of the correlator 406 is connected to an operation unit 408 for performing an argument operation on the output signal of the correlator 406. The output of the operation unit 408 is connected to a multiplier 410 which multiplies the output by $1/2\pi(L/2)T_{MCM}$. A further operation unit 412 for performing a $e^{-j(\pi\Delta f T_{MCM}/L)}$ operation is provided in order to derive the frequency shift for the whole MCM symbol from the frequency shift determined for the portion having the length of L, i.e. the identical sections 300 shown in FIG. 3.

In case of a channel with strong reflections, for example due to a high building density, the correlations described above might be insufficient for obtaining a suitable coarse frequency synchronization. Therefore, in accordance with a third embodiment of the present invention, corresponding values of the two portions which are correlated in accordance with a second embodiment, can be weighting with corresponding values of stored predetermined reference patterns corresponding to said two identical sequences of the reference symbol. This weighting can maximize the probability of correctly determining the frequency offset. The mathematical description of this weighting is as follows:

$$\Delta f = \frac{1}{2\pi\frac{L}{2}T_{MCM}}\arg\left(\sum_{k=1}^{\frac{L}{2}}\left[\tilde{r}\left(k + \frac{L}{2}\right)\cdot \tilde{r}^*(k)\right]\cdot\left[S_{AM}(k)S^*_{AM}\left(k + \frac{L}{2}\right)\right]\right) \quad \text{(Eq. 14)}$$

$S_{AM}$ designates the amplitude-modulated sequence which is known in the receiver, and $S^*_{AM}$ designates the complex conjugate thereof.

If the above correlations are calculated in the frequency domain, the amount of $$\sum_{k=1}^{\frac{L}{2}}\left[\tilde{r}\left(k + \frac{L}{2}\right)\cdot \tilde{r}^*(k)\right]\cdot\left[S_{AM}(k)S^*_{AM}\left(k + \frac{L}{2}\right)\right] \quad \text{(Eq. 15)}$$

is used rather than the argument. This amount is maximized as a function of a frequency correction. The position of the maximum determines the estimation of the frequency deviation. As mentioned above, the correction is performed in a feed forward structure.

Figure 6:
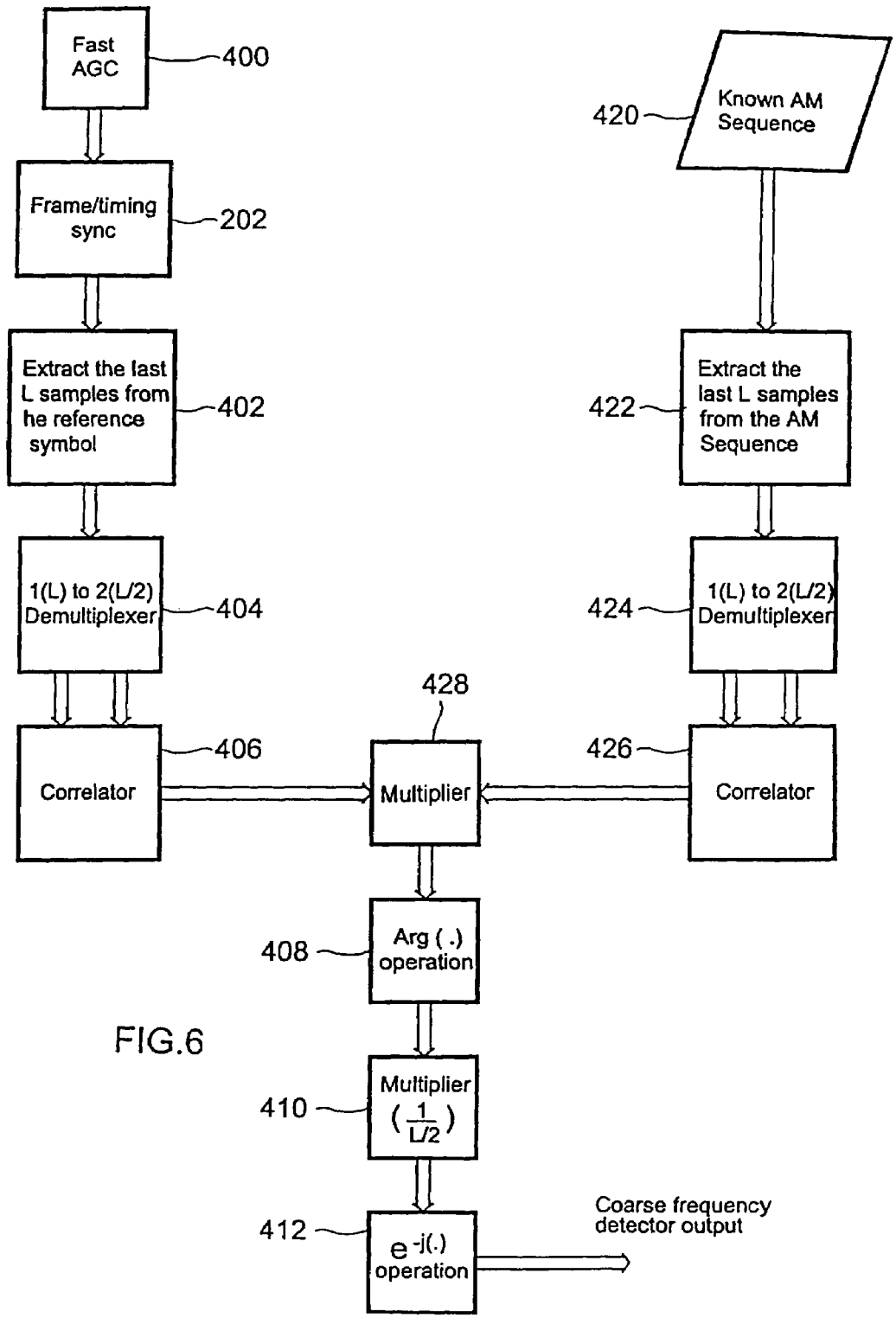
FIG. 6 shows a block diagram of another embodiment of a coarse frequency synchronization unit.

A block diagram of an apparatus for performing the coarse frequency synchronization in accordance with the third embodiment of the present invention is shown in FIG. 6. Blocks 400, 202, 402, 404 and 406 shown in the left branch of FIG. 6 correspond to the respective blocks in FIG. 5. In the right branch of FIG. 6, the preparation of the known AM sequence is shown. The known AM sequence is read from a memory 420 and applied to an extracting unit 422 which extracts the last L samples therefrom. The output of the extracting unit 422 is connected to a demultiplexer 424 having one input and two outputs in order to recover the identical sections having a length of L/2 each. Both outputs of the demultiplexer are connected with a correlator 426 which performs a correlation between the two identical sections.

A multiplier 428 is provided which multiplies the output of the correlator 406 by the output of the correlator 426. The output of the multiplier 428 is connected to an argument operation unit 408. The output of the multiplier is applied to an argument operation unit 408, a multiplier 410 and an operation unit 412 in sequence. The mode of operation of these units corresponds to that of the corresponding units which are shown in FIG. 5.

Figure 7:
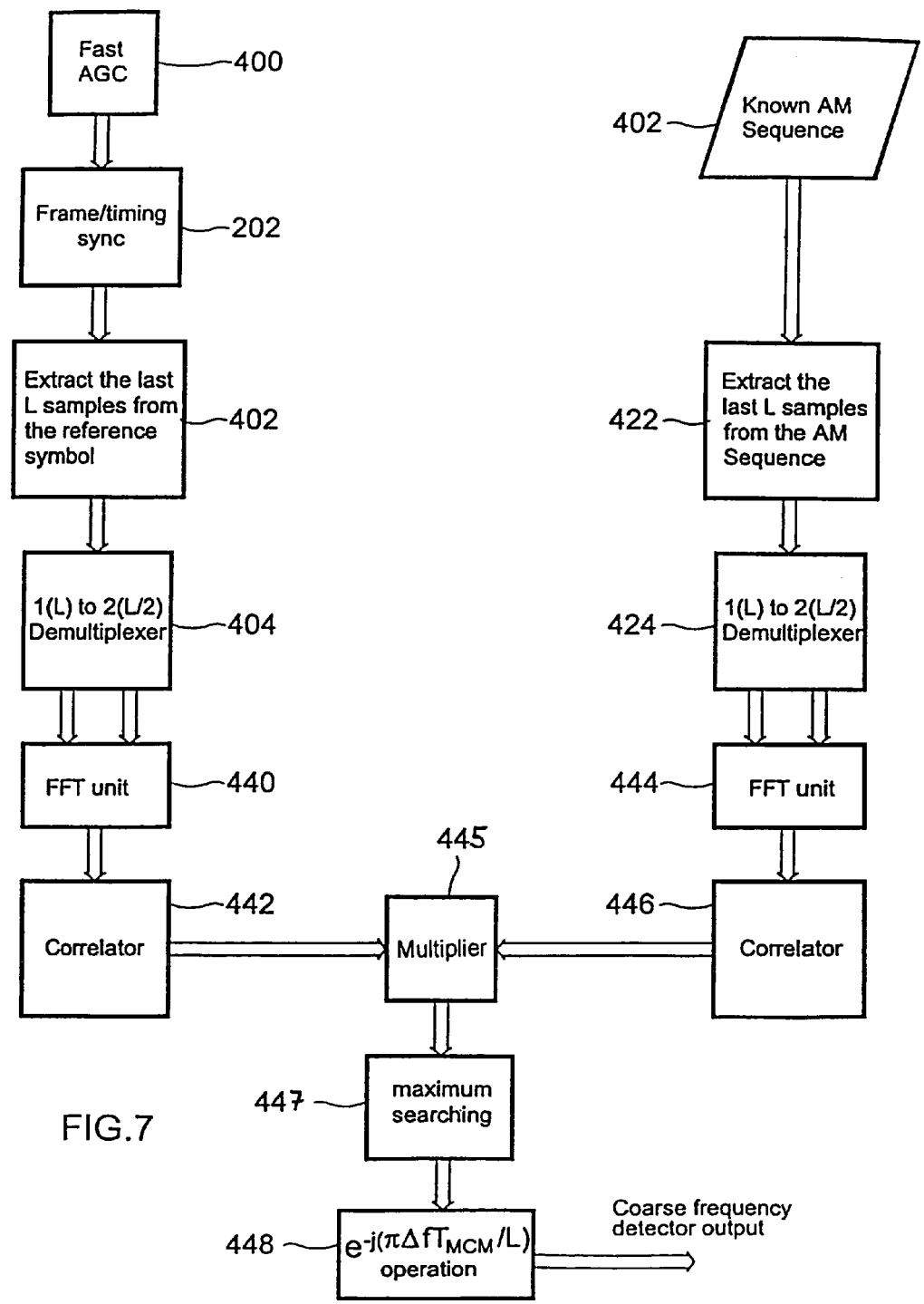
FIG. 7 shows a block diagram of still another embodiment of a coarse frequency synchronization unit.

A alternative structure of an apparatus for performing the coarse frequency synchronization in accordance with the third embodiment of the present invention in the frequency domain is shown in FIG. 7. As shown in FIG. 7, a fast Fourier transform unit 440 is provided between the demultiplexer 404 and a correlator 442, and a fast Fourier transform unit 444 is provided between the demultiplexer 424 and a correlator 426. The outputs of the correlators 442 and 446 are connected to a multiplier 445. The output of the multiplier 445 is connected to a maximum searching unit 447. Finally, a unit 448 for performing a $e^{-j(\pi\Delta f \tilde{T}_{MCM}/L)}$ operation is provided. The output of this unit 448 represents the output of the coarse frequency synchronization device.

In case of performing the coarse frequency synchronization in the frequency domain it is possible to make use of the existing FFT at the beginning of the detection for the coarse frequency synchronization rather than providing an additional fast Fourier transform unit.

Following the course frequency synchronization described above, a fine frequency synchronization can be performed in case such a fine frequency synchronization is useful.

What is claimed is:

1. A method of performing a coarse frequency synchronization compensation for a carrier frequency deviation from an oscillator frequency in a demodulation system capable of demodulating a signal having a frame structure, said frame structure comprising at least one useful symbol and a reference symbol, said reference symbol being an amplitude-modulated bit sequence which comprises two identical sequences, said method comprising the steps of:
   receiving said signal;
   down-converting said received signal;
   performing an amplitude-demodulation of the down-converted signal in order to generate an envelope, said envelope having two portions which are based on said identical sequences;
   correlating one of said portions of said envelope with another one of said portions in order to determine said carrier frequency deviation; and
   controlling said oscillator frequency based on said carrier frequency deviation:
   wherein said correlating step further comprises weighting of corresponding values of said two portions with corresponding values of said two sequences.

2. The method of claim 1, wherein said carrier frequency deviation is determined as follows:

$$\Delta f = \frac{1}{2\pi \frac{L}{2} T_{MCM}} \arg\left( \sum_{k=1}^{\frac{L}{2}} \left[ \tilde{r}\left(k + \frac{L}{2}\right) \cdot \tilde{r}^*(k) \right] \cdot \left[ S_{AM}(k) S_{AM}^*\left(k + \frac{L}{2}\right) \right] \right)$$

wherein $\tilde{r}$ designates values of said portions;
$\tilde{r}^*$ designates the complex conjugate of said values of said portions;
$T_{MCM}$ designates the duration of said useful symbol;
k designates an index;
L designates the number of values of said two sequences of said reference symbol;
$S_{AM}$ designates values of said identical sequences; and
$S^*_{AM}$ designates the complex conjugate of said values of said identical sequences.

3. The method according to claim 1, wherein said signal is an orthogonal frequency division multiplex signal.

4. The method according to claim 1, further comprising the step of performing a fast automatic gain control of said received down-converted signal prior to the step of performing said amplitude-demodulation.

5. The method according to claim 1, wherein the step of performing said amplitude-demodulation comprises the step of calculating an amplitude of said signal using the alpha$_{max+}$beta$_{min-}$ method.

6. The method according to claim 1, further comprising the steps of sampling respective amplitudes of said received down-converted signal and comparing said sampled amplitudes with a predetermined threshold in order to generate a bit sequence in order to perform said amplitude-demodulation.

7. The method according to claim 6, wherein the step of sampling respective amplitudes of said received down-converted signal further comprises the step of performing an over-sampling of said received down-converted signal.

8. An apparatus for performing a coarse frequency synchronization compensation for a carrier frequency deviation from an oscillator frequency, for a demodulation system capable of demodulating a signal having a frame structure, said frame structure comprising at least one useful symbol and a reference symbol, said reference symbol being an amplitude-modulated bit sequence which comprises two identical sequences, said apparatus comprising:
   receiving means for receiving said signal;
   a down-converter for down-converting said received signal;
   an amplitude-demodulator for performing an amplitude-demodulation of said down-converted signal in order to generate an envelope, said envelope having two portions which are based on said identical sequences;
   a correlator for correlating one of said portions of said envelope with another one of said portions in order to determine said carrier frequency deviation; and
   means for controlling said oscillator frequency based on said carrier frequency deviation;
   wherein said correlator comprises means for weighting of corresponding values of said two portions with corresponding values of said two sequences.

9. The apparatus of claim 8, further comprising means for determining said carrier frequency deviation as follows:

$$\Delta f = \frac{1}{2\pi \frac{L}{2} T_{MCM}} \arg\left( \sum_{k=1}^{\frac{L}{2}} \left[ \tilde{r}\left(k + \frac{L}{2}\right) \cdot \tilde{r}^*(k) \right] \cdot \left[ S_{AM}(k) S_{AM}^*\left(k + \frac{L}{2}\right) \right] \right)$$

wherein $\tilde{r}$ designates values of said portions;
$\tilde{r}^*$ designates the complex conjugate of said values of said portions;
$T_{MCM}$ designates the duration of said useful symbol;
k designates an index;
L designates the number of values of said two sequences of said reference symbol;
$S_{AM}$ designates values of said identical sequences; and
$S^*_{AM}$ designates the complex conjugate of said values of said identical sequences.

10. The apparatus according to claim 8, wherein said signal is an orthogonal frequency division multiplexed signal.

11. The apparatus according to claim 8, further comprising means for performing a fast automatic gain control of said received down-converted signal preceding said amplitude-demodulator.

12. The apparatus according to claim 8, wherein said amplitude-demodulator comprises means for calculating an amplitude of said signal using an alpha$_{max+}$ beta$_{min-}$ method.

13. The apparatus according to claim 8, further comprising means for sampling respective amplitudes of said down-converted signal, wherein said amplitude-demodulator comprises means for comparing said sampled amplitudes with a predetermined threshold in order to generate a bit sequence.

14. The apparatus according to claim 13, wherein said means for sampling comprises means for over-sampling said down-converted signal.

* * * * *